United States Patent Office 3,189,640
Patented June 15, 1965

3,189,640
CHLOROFORMATES
Joseph J. Dietrich, Copley, Andrew J. Kaman, Barberton, and Henry C. Stevens, Akron, Ohio, assignors, by mesne assignments, to Pittsburgh Plate Glass Company
No Drawing. Filed Dec. 23, 1958, Ser. No. 782,355
5 Claims. (Cl. 260—463)

This invention deals with polychloroformates. More particularly, it relates to particular polychloroformates of alkylidene diphenol carbonates.

According to this invention, polychloroformates, and notably dichloroformates, of alkylidene diphenol carbonates are provided. These contemplated alkylidene diphenol carbonates are characterized, among other things, by the presence of reactive chloroformate groups. By virtue of possessing a plurality of highly reactive chloroformate groups, e.g., being polyfunctionally reactive, these particular chloroformates are useful for preparing high molecular weight synthetic resins. They may be homopolymerized to prepare high molecular weight polycarbonates of recognized utility, or they may be reacted with other polyfunctional materials such as polyols, polyamines, etc., to obtain high molecular weight products.

Now it has been discovered that the polychloroformates of alkylidene diphenol carbonates in which the ratio of chloroformate groups to carbonate linkages (or alkylidene diphenol residues) is within certain limits are polyfunctional in containing a plurality of reactive chloroformate groups. Thus, in accordance herewith, reactive polychloroformates of alkylidene diphenol carbonates are provided having 0.5 to 4 carbonate linkages per chloroformate group. Typical of the more preferable contemplated chloroformates are dichloroformates of alkylidene diphenol carbonates having from 1 to 8 inclusive carbonate linkages.

The dichloroformates have a composition which conforms to and may be represented as:

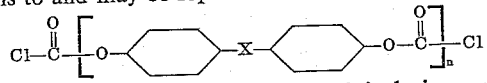

wherein $n$ is a value of between 2 to 9 inclusive, preferably 4 to 7, and X denotes a linking radical between two phenyl groups, notably an alkylidene radical. In these chloroformates, the carbonate groups

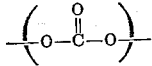

link residues of the alkylidene diphenol, e.g., the moieties

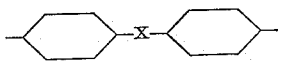

Thus, they contain carbonate and chloroformate groups in the ratio of 0.5 to 4 (preferably 1.5 to 3) carbonate groups per chloroformate group. Expressed otherwise, these highly reactive dichloroformates contain 2 to 9 alkylidene diphenol moieties, or 1 to 4.5 such moieties per chloroformate group.

Moreover, the chloroformate groups of these materials are as a rule terminal groups. That is, the chloroformates of alkylidene diphenol carbonates are essentially linear chains comprised of alternating carbonate and alkylidene diphenol residues terminating at each end of the chain in a reactive chloroformate group linked directly to a phenyl group of the diphenol moiety.

Dichloroformates of Bisphenol A (p,p'-isopropylidene diphenol) are especially preferred. These materials have compositions corresponding to the formula:

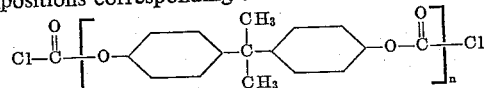

wherein $n$ is a value between 2 and 9, ideally from 2 to 4. They thus have from 1 to 8 carbonate groups linking the Bisphenol A moieties and two terminal chloroformate groups, a ratio of 0.5 to 4 carbonate groups per chloroformate group. Ideally, they have 0.5 to 1.5 carbonate groups per chloroformate group. Chloroformate compositions of this alkylidene diphenol carbonate have chloroformate chlorine concentrations ranging from about 12 percent (when $n$ is an average value of 2) to about 3.0 percent (when $n$ is an average value of about 9) by weight of the chloroformate.

Generally, these dichloroformates are solids appreciably soluble in a number of common organic solvents including the partially halogenated hydrocarbons, notably the partially chlorinated aliphatic hydrocarbons of 1 to 3 carbons such as chloroform, methyl chloride, methylene chloride, ethyl chloride, 1,2-dichloroethane, methyl chloroform, 1,1,2-trichloroethane, trichloroethylene, symmetrical tetrachloroethane, as well as the partially chlorinated propanes. They are not, however, appreciably soluble in water, normally liquid aliphatic hydrocarbons such as those having 5 to 20 carbons including, among others, n-pentane, n-hexane, 2-methylpentane, 2,2-dimethylbutane, 2,3-dimethylbutane, n-decane, n-octane, n-tridecane, n-undecane, n-pentadecane, 2-methylheptane, 2,2-dimethylheptane and 3-ethylheptane.

Liquid compositions of these dichloroformates are particularly useful. Thus, solutions of the contemplated dichloroformates in a good organic solvent therefor, e.g., the above enumerated liquid partially halogenated hydrocarbons, comprise a preferred form in which to formulate these chloroformates. When so formulated, it is desirable that the solution be essentially free of sodium hydroxide or like strong alkali should water be present.

Being polyfunctional (having a plurality of reactive chloroformate groups), the chloroformates are employed in the preparation of high molecular weight mixed polycarbonates, e.g., polycarbonates comprised of residues of two or more different diols including diphenols, aliphatic diols, etc., linked through carbonate groups. Such mixed high molecular weight polycarbonates are prepared by reaction of the chloroformate with a diol such as diethylene glycol, diphenols or bisphenols such as catechol or alkylidene diphenol other than the one from which the chloroformate is derived. Mixed polycarbonates of this type are especially noteworthy because they may be comprised mainly in their chain of alkylidene diphenol carbonate residues periodically interrupted by the residue of the other diol, diphenol or bisphenol.

Because the dichloroformate is constituted of a limited number of repeating residues of the alkylidene diphenol, it is possible to controllably introduce into a final polycarbonate product only a minimum amount of a diol residue other than the alkylidene diphenol. For many purposes, this is highly desirable since even slight modification of the repetitive regularity of the polycarbonate influences profoundly the properties. It is thus possible to obtain a mixed polycarbonate retaining the advantageous properties of the alkylidene diphenol carbonate but beneficially modified by the presence of a small weightwise amount of another diol residue.

These chloroformates are not easily obtained. In accordance with a particular embodiment hereof, these dichloroformates of alkylidene diphenol carbonates are provided with relative ease and good yield. Thus, it has been discoverd that preparation of these dichloroformates may be effectively accomplished by reacting a water soluble dimetal salt of the alkylidene diphenol such as disodium salt and phosgene in an aqueous medium having its alkalinity regulated by the presence of an alkaline buffer exemplified by sodium carbonate.

In a typical performance of the process, an aqueous solution of a dimonovalent metal salt of an alkylidene diphenol is established, e.g., by dissolving the diphenol in an aqueous sodium hydroxide, potassium hydroxide or other alkali metal solution. Sufficient alkali metal hydroxide is used to establish a composition corresponding to that provided by mixing two moles of sodium hydroxide and one mole of the diphenol. Thus, the amount of sodium hydroxide or like strong alkali employed to form the solution should be limited to that theoretically required to form the diphenate (or di-salt) of the diphenol. The presence of substantially more than this amount of sodium hydroxide during the reaction is detrimental.

To a solution so established a buffer is added prior to commencing the addition of phosgene and initiating the reaction. Buffering of the type here effective entails including sodium carbonate or like alkali metal carbonate in the reaction medium either by direct addition or generation in situ. Other alkaline buffers, buffering in a manner comparable to sodium carbonate are also useful. These include sodium phosphate, potassium phosphate and sodium acetate. In general, the effect of this buffering is to esbtalish the pH of the reaction medium, at least after the reaction has commenced, to an alkaline pH not in excess of pH 12, usually in the pH range of 9 to 11. Typically, one mole, usually 1.2 to 4.0 moles of sodium carbonate per mole of diphenol (or its salt) is used. Considerable latitude above or below these amounts is, nevertheless, permissible.

With the aqueous solution so established and buffered, phosgene is then introduced. Best results are obtained by adding the phosgene as rapidly as possible. Thus, it is found preferable to introduce the phosgene as a liquid solution of phosgene in an inert solvent of the type which may be included in the reaction medium, rather than as gaseous phosgene although it is possible to use gaseous phosgene.

An inert organic diluent is included advantageously in the reaction medium. Best inert organic diluents are found to be the essentially water insoluble organic diluents in which the dichloroformate products are soluble. Solvents with these properties are halogenated hydrocarbons of 1 to 3 carbon atoms, notably the chlorinated aliphatic hydrocarbons such as methyl chloride, methylene chloride, chloroform, ethyl chloride, 1,1-dichloroethane, 1,2-dichloroethane, perchloroethylene, tetrachloroethane, and the like.

Moreover, it is preferable to conduct the reaction while the temperature of the reaction medium is below about 35° C., preferably as cool as possible consistent with maintaining the reaction medium liquid, e.g., above its freezing point. Normally suitable are temperatures between −10° C. and 25° C.

While the process has been hereinbefore described most specifically in terms of adding a phosgene solution to an aqueous buffered solution of the disodium salt of the diphenol, other techniques for bringing the reagents together into reactive contact while observing the proper reaction conditions are not precluded. Thus, it is possible, although not preferable, to simultaneously add the phosgene solution and a solution of the diphenol salt to a liquid body of the inert solvent, buffer and water. Other procedures for accomplishing the reaction in accordance with the outlined principles also suggest themselves.

The amount of phosgene usually is on the order of 2 or more moles of phosgene per mole of diphenol (or its salt). Generally charged is between 2 and 3 moles of phosgene per mole of diphenol.

The following examples illustrate the manner in which dichloroformates of alkylidene diphenol polycarbonates herein contemplated may be prepared:

EXAMPLE I

A two-liter, three-necked flask equipped with a stirrer was charged with 48 grams (1.2) moles of sodium hydroxide, 136.8 grams (0.6 mole) of Bisphenol A (p,p′-isopropylidene diphenol), 95.4 grams (0.9 mole) of sodium carbonate and 900 milliliters of water. After some stirring, a clear solution resulted which then cooled to 25° C. Then 500 milliliters of methylene chloride was added and the resulting mixture cooled to 0° C.

To this mixture while maintaining it at 0° C., a phosgene solution of methylene chloride prepared by dissolving 125 grams (1.26 moles) of phosgene in 100 milliliters of methylene chloride was added in 5 minutes to the reaction medium through a fritted glass inlet tube. Thereafter, the mixture was allowed while strring to warm slowly to 150 C., this taking 15 minutes. At the conclusion of this, the reaction medium was washed with dilute sulfuric acid in order to permit phase separation of the organic layer. After phase separating this organic layer, it was dried over magnesium perchlorate.

A sample of the bischloroformate produced according to the above procedure was analyzed and found to contain 7.57 percent chloroformate chlorine by weight. This bischloroformate had a composition equivalent to the following:

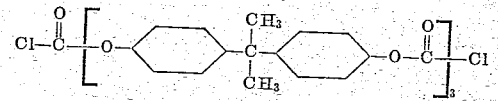

The ratio of carbonate to chloroformate groups in this composition was one to one. The composition contains three Bisphenol A residues for every two chloroformate groups, and infrared analysis indicated the virtual absence of any phenolic hydroxyl groupings.

EXAMPLE II

Example I was duplicated except that a total of 1.14 moles of phosgene were added. The resulting product had a chloroformate chlorine content of about 7.77 percent by weight and was comprised of carbonate and chloroformate groups in the ratio of one to one. It had three Bisphenol A residues for every two chloroformate groups.

EXAMPLE III

The procedure of Example I was duplicated except that the amounts of materials were 50 percent greater, e.g., 0.9 mole of Bisphenol A. 1.65 moles of phosgene were added. The resulting dichloroformate product had a chloroformate chlorine content of 7.24 percent, and a composition having approximately three Bisphenol A residues and two carbonate residues for every two chloroformate groups.

EXAMPLE IV

The product of Example III was separated into fractions by adding heptane to a sample of the organic phase (a methylene chloride solution of the chloroformate composition) separated from the reaction medium. Thus, 100 milliliters of heptane were added to 100 milliliters of the organic phase of the reaction medium at 25° C. A first precipitate was formed and separated. Thereafter, two further additions of 100 and 200 milliliters of heptane were made to the mother liquor, each time separating the precipitate. Each of the precipitated products as well as the residue in the final mother liquor was analyzed for chloroformate chlorine with these results:

Table I

| Precipitate | Weight Percent Total Product | Weight Percent Chloroformate Chlorine |
|---|---|---|
| 1 | 3.63 | 1.93 |
| 2 | 13.18 | 3.51 |
| 3 | 16.36 | 3.63 |
| Residue | 66.83 | 11.20 |

The residue is a chloroformate of Bisphenol A carbonate having a composition corresponding approximately to:

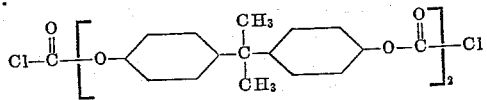

It thus contains carbonate and chloroformate groups in the approximate ratio of 0.5 to 1.0.

The chloroformates of Bisphenol A carbonates comprising precipitates B and C contain 4 carbonate groups per chloroformate group.

EXAMPLE V

A one-liter, three-necked stirrer equipped flask was charged with 24 grams (0.6 mole) of NaOH, 310 milliliters of water and 68.4 grams (0.3 mole) of Bisphenol A. After the Bisphenol A dissolved, 47.7 grams (0.45 mole) of sodium carbonate in 150 milliliters of water was added. This mixture was then cooled to 25° C., and 250 milliliters of methylene chloride added. A total of 37.8 grams (0.382 mole) of gaseous phosgene was then added at an essentially uniform rate in 35.75 minutes through a fritted glass inlet tube to the mixture.

After this addition of phosgene, the mixture was stirred for 5 minutes, the non-aqueous layer phase separated, water washed several times and then dried over magnesium perchlorate. The chloroformate product had a chloroformate chlorine content of 3.98 percent by weight and contained an average of approximately 3 carbonate groups per chloroformate group.

EXAMPLE VI

The organic solution of the dichloroformate composition produced in Example V was fractionally precipitated by adding to such solution first 50 milliliters of n-hexane to obtain a first precipitate, and then adding 100 milliliters of n-hexane to the mother liquor resulting from separating the first precipitate. As a result, a chloroformate of Bisphenol A carbonate (12.00 weight percent chloroformate chlorine) having 0.5 carbonate groups per chloroformate group and two Bisphenol A residues was obtained as the first precipitate. The second precipitate dichloroformate composition had approximately 4.0 to 4.5 carbonate groups per chloroformate group and 8 to 9 Bisphenol A residues.

EXAMPLE VII

Duplicating Example V except for maintaining the reaction temperature at 0° C. to 4° C. yielded a dichloroformate of Bisphenol A carbonate having about 1.5 carbonate groups per chloroformate group and a chloroformate chlorine content of 5.37 percent by weight.

As indicated hereinbefore, the chloroformates may be prepared by an addition of reactants other than illustrated in the foregoing examples. The following example illustrates another procedure:

EXAMPLE VIII

A one-liter, four-necked stirrer equipped flask was charged with 47.7 grams (0.45 mole) of sodium carbonate, 50 milliliters of water and 300 milliliters of methylene chloride. With the mixture being stirred and maintained at 8° C. to 12° C., gaseous phosgene and a solution provided by mixing 24 grams (0.6 mole) of NaOH and 68.4 grams (0.3 mole) of Bisphenol A in 450 milliliters of water were individually added. Before phosgene addition was commenced, 40 milliliters of the aqueous solution were added. Thereafter, the remainder of the solution was added from a burette at the rate of 11 milliliters per minute over 41 minutes. The phosgene was added simultaneously at the rate of 1.04 grams per minute for 42 minutes, thus introducing 44.1 grams (0.445 mole) of phosgene.

After phase separating the organic layer and washing and drying over magnesium perchlorate, the chloroformate produce was analyzed and contained 6.57 percent by weight of chloroformate chlorine. This dichloroformate Bisphenol A composition had 2 carbonate groups per chloroformate group.

These dichloroformates are of particular usefulness in formation of higher molecular weight products. They may be reacted with dihydric materials such as ethylene glycol or compounds containing at least two phenolic hydroxyl groups. In such fashion, the high molecular weight material has its composition principally characterized by the presence of linear chains comprised of the dichloroformate residues periodically interrupted by the residue of the dihydric reactant.

The following examples illustrate the preparation of high molecular weight mixed polycarbonates provided from the contemplated dichloroformates:

EXAMPLE IX

To 40 grams of the solid dichloroformate composition obtained in Example II dissolved in 200 milliliters of methylene chloride, 4.72 grams (0.04 mole) of hexamethylene glycol were added. While stirring and with the resulting mixture at 25° C., 7.7 grams (0.1 mole) of pyridine were added in 10 minutes. After stirring for 45 minutes more, the product was recovered from the medium. It had an intrinsic viscosity in dioxane of 0.6 and a softening point of 150° C. to 170° C. A solvent cast film of the product had a tensile strength of 8500 pounds per square inch.

EXAMPLE X

To a solution provided by dissolving in 200 milliliters of methylene chloride 40 grams of the recovered solid product prepared in Example III, some 12.8 grams (0.035 mole) of 2,2-bis(2,3,5,6-tetrachloro-4-hydroxy phenyl)-propane (tetrachloro Bisphenol A) were added. With the resulting mixture at 25° C. and being agitated, 8 grams of pyridine were added. The resulting product was isolated. It had a softening point of 170° C. to 217° C., and a solvent cast film thereof had a tensile strength of 10,340 pounds per square inch.

Other polyfunctional materials, particularly difunctional materials, reactive with chloroformate groups may be reacted with these dichloroformates. Diamines such as piperazine, ethylene diamine, 1,3-diaminopropane, hexamethylene diamine, methylene bisaniline, p,p'-diaminodiphenyl ether, diamino derivatives of polycyclics including naphthalene, diphenyl, anthracene, etc., may be reacted with the dichloroformate. The resulting high molecular weight product is comprised of Bisphenol A carbonate residues periodically interrupted by carbamate linkages forming the Bisphenol A residue with the residue of the diamine. By proper selection of the ratio of carbonate to chloroformate groups in the dichloroformate, the ratio of carbamate to carbonate groups in the ultimate product may be controlled effectively.

Since in many instances only slight modifications of Bisphenol A polycarbonates per se result in polymeric materials of substantially different properties, the dichloroformates of the present invention are ideally suited to the preparation of high molecular weight polycarbonates of Bisphenol A or like alkylidene diphenols having periodic interruptions in the normal repetitive polycarbonate structure.

In lieu of Bisphenol A (p,p'-isopropylidene diphenol), other alkylidene diphenols may be employed following the procedures outlined in the examples to prepare dichloroformates of alkylidene diphenol carbonates having the specified ratio of carbonate to chloroformate groups. Besides alkylidene diphenols, diphenols having linking radicals other than alkylidene radicals are of use. Some such diphenols include:

(4,4'-dihydroxy-diphenyl)-methane
1,1-(4,4'-dihydroxy-diphenyl)-cyclohexane
2,2'-methylene bis(4-methyl-6-tertiary butyl phenol)
2,2'-methylene bis(4-ethyl-6-tertiary butyl phenol)
4,4'-butylidene bis(3-methyl-6-tertiary butyl phenol)
4,4'-thiobis(3-methyl-6-tertiary butyl phenol)
1,1-(4,4'-dihydroxy-3,3'-dimethyl-diphenyl)-cyclohexane
2,2-(2,2'-dihydroxy-4,4'-di-tert-butyl-diphenyl)-propane
3,4-(4,4'-dihydroxy-diphenyl)-hexane
1,1-(4,4'-dihydroxy-diphenyl)-1-phenyl-ethane
2,2-(4,4'-dihydroxy-diphenyl)-butane
2,2-(4,4'-dihydroxy-dihpenyl)-pentane
3,3-(4,4'-dihydroxy-diphenyl)-pentane
2,2-(4,4'-dihydroxy-diphenyl)-3-methyl-butane
2,2-(4,4'-dihydroxy-diphenyl)-hexane
2,2-(4,4'-dihydroxy-dihpenyl)-4-methyl-pentane
2,2-(4,4'-dihydroxy-dihpenyl)-heptane
4,4-(4,4'-dihydroxy-diphenyl)-heptane
2,2-(4,4'-dihydroxy-diphenyl)-tridecane
2,2-bis(3,5-dichloro-4-hydroxy phenyl)-propane
2,2-bis(tetrachloro hydroxy phenyl)-propane
2,2-bis(3-chloro-4-hydroxy phenyl)-propane
2,2-(3,3'-dimethyl-4,4'-dihydroxy-diphenyl)-propane While the present invention has been described with respect to specific details of certain embodiments, it is not intended that the invention be construed as limited to such details except insofar as such details appear in the appended claims.

We claim:

1. A method of preparing a polychloroformate of an alkylidene diphenol carbonate having the formula

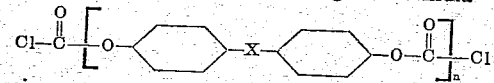

wherein $n$ represents a value of from 2 to 9 and X is an alkylidene linking group which comprises adding a weakly alkaline salt to an aqueous solution of an alkylidene diphenol having the formula

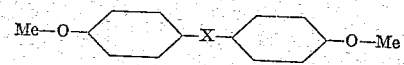

wherein Me is an alkali metal and X is an alkylidene group, having a pH above 11 to buffer said solution to a pH of 9 to 11, maintaining said buffered solution at a temperature below about 35° C. and adding to said aqueous solution of water soluble said dialkali metal salt of an alkylidene diphenol buffered with a weakly alkaline salt to a pH of 9 to 11 at least about 2 moles of phosgene per mole of said diphenol.

2. A method of preparing a dichloroformate of an alkylidene diphenol carbonate having the formula

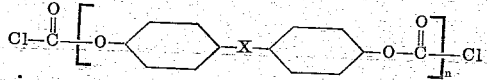

wherein $n$ represents a value of from 2 to 9 and X is an alkylidene linking group which comprises establishing an aqueous solution of a water-soluble alkaline salt of a diphenol having the formula

wherein Me is an alkali metal and X is an alkylidene group and a pH of above 11, adding a weakly alkaline salt to said solution to buffer it to an alkalinity equivalent to that provided by including sodium carbonate in the solution, maintaining said solution at a temperature below about 35° C. and adding at least 2 moles of phosgene per mole of the diphenol to the solution maintained at below 35° C.

3. The method of claim 2 wherein a partially chlorinated hydrocarbon of 1 to 3 carbon atoms is included in the reaction medium, and the phosgene is added as a partially chlorinated hydrocarbon solution.

4. A method of preparing a polychloroformate of p,p'-isopropylidene diphenol carbonate having from 0.5 to 4 carbonate groups per chloroformate group which comprises rapidly adding to a liquid solution of the disodium salt of the diphenol maintained at a temperature below 35° C. and buffered with sodium carbonate at least 2 moles of phosgene per mole of the diphenol.

5. A method of preparing a polychloroformate of p,p'-isopropylidene diphenol carbonate having from 0.5 to 4 carbonate groups per chloroformate group which comprises rapidly adding to a liquid solution of the disodium salt of the diphenol buffered with sodium carbonate at a temperature below 35° C. at least in excess of equimolar amounts of phosgene per mole of said diphenol, and isolating the said p,p'-isopropylidene diphenol carbonate thus formed.

References Cited by the Examiner

UNITED STATES PATENTS 2,455,652  12/48  Bralley et al. _____ 260—463
2,808,371  10/57  Stevens _____ 260—463

OTHER REFERENCES

Schnell: Angew. Chem., 68, No. 20 (1956), pages 634–646.

Schnell: Industrial and Engineering Chemistry, vol. 51, No. 2, February 1959, pages 157–160.

CHARLES B. PARKER, *Primary Examiner.*